United States Patent [19]
Chai et al.

[11] Patent Number: 5,886,552
[45] Date of Patent: Mar. 23, 1999

[54] DATA RETIMING CIRCUIT

[75] Inventors: Sang-Hoon Chai; Hee-Bum Jung; Won-Chul Song, all of Daejeon, Rep. of Korea

[73] Assignees: Electronics And Telecommunications Research Institute, Deajon; Korea Telecom, Seoul, both of Rep. of Korea

[21] Appl. No.: 859,203

[22] Filed: May 20, 1997

[30]  Foreign Application Priority Data

Dec. 2, 1996 [KR]  Rep. of Korea ...................... 96-61028

[51] Int. Cl.⁶ ..................................................... H04L 7/00
[52] U.S. Cl. ........................... 327/165; 327/144; 375/359
[58] Field of Search .................................. 327/165, 141, 327/144, 156, 158, 159; 375/359, 376

[56]  References Cited

U.S. PATENT DOCUMENTS

| | | | |
|---|---|---|---|
| 4,841,551 | 6/1989 | Avaneas ................................... | 327/141 |
| 5,452,324 | 9/1995 | Lewis et al. ............................. | 327/395 |
| 5,671,258 | 9/1997 | Burns et al. ............................. | 327/291 |

OTHER PUBLICATIONS

ILEE Journal of Solid–State Circuits, vol. 24, No. 1 Feb., 1989, *Metastability Behavior of CMOS ASIC Flip–Flops in Theory and Test* by Jens U. Horstmann, Hans W. Eichel and Robert L. Coates pp. 146–157.

*Primary Examiner*—Tuan T. Lam
*Attorney, Agent, or Firm*—Cohen, Pontani, Lieberman & Pavane

[57]  ABSTRACT

An improved data retiming circuit which is capable of more effectively retiming an externally inputted data by using a plurality of clocks from a voltage controlled oscillator of a phase-locked loop. The circuit includes a first delay unit for increasing a rising and falling time from an externally inputted data by a predetermined time as much as a clock phase difference, a first data latch unit connected so that the phase from the clock generator can be to correspond with the number of different clocks for latching the data inputted in accordance with the clock, a second delay unit for receiving the data from the first delay unit and for delaying the data so that a clock is selected and coincides with the timing until the output of the clock, a data latch state determination unit for determining the logic signal state of the data latched by the first data latch unit in an analog method, a clock selection unit for logically compares a plurality of clocks inputted and a data state signal outputted from the data latch state determination unit and for selecting a retiming signal, and a second data latch unit for latching the data relayed by the second delay unit in accordance with the retiming clock signal.

11 Claims, 4 Drawing Sheets

DATA RETIMING CIRCUIT

BACKGROUND OF THE INVENTION

1. Field of the Invention

The present invention relates to a data retiming circuit, to an improved data retiming circuit which is capable of more effectively retiming an externally inputted data by using a plurality of clocks from a voltage controlled oscillator of a phase-locked loop.

2. Description of the Conventional Art

Generally, a receiving unit of a high speed data transmission circuit which uses a high frequency signal uses a data retiming circuit for improving a noise characteristic.

The data retiming circuit which uses a plurality of channels is configured to be made simpler for a desired integration by using one chip.

FIG. 1 is a circuit diagram illustrating a conventional data retiming circuit.

As shown therein, there are connected a PLL 10, a delay unit 20, and a clock selection unit 30. The clock selection unit 30 includes a data sampling unit 31 and a voting circuit 32 for selecting a clock.

However, the conventional data retiming circuit is complex due to a plurality of digital logic circuits. In particular, if there are provided a plurality of channels, it is difficult to integrate into one chip.

There is a conventional method of "Metastability behavior of CMOS ASIC flip-flops in theory and test" (Jens u., etc.,; JSSC Vol-24 No.-1, 1989, USA) which is directed to using a digital logic circuit in order to implement a data retiming method, for thus forming a clock selection unit, so that the construction of the circuit is made complex.

SUMMARY OF THE INVENTION

Accordingly, it is an object of the present invention to provide an improved data retiming circuit which overcomes the aforementioned problems encountered in the conventional art.

It is another object of the present invention to provide an improved data retiming circuit which is capable of enabling a simpler construction of a circuit by changing a part of a clock selection circuit with an analog circuit, for thus more effectively implementing an integration circuit.

It is another object of the present invention to provide an improved data retiming circuit which is capable of more effectively retiming an externally inputted data by using a plurality of clocks from a voltage control oscillator of a phase-locked loop.

To achieve the above objects, there is provided an improved data retiming circuit which includes a first delay unit for increasing a rising and falling time from an externally inputted data by a predetermined time as much as a clock phase difference, a first data latch unit connected so that the phase from the clock generator can be to correspond with the number of different clocks for latching the data inputted in accordance with the clock, a second delay unit for receiving the data from the first delay unit and for delaying the data so that a clock is selected and coincides with the timing until the output of the clock, a data latch state determination unit for determining the logic signal state of the data latched by the first data latch unit in an analog method, a clock selection unit for logically comparing a plurality of clocks inputted and a data state signal outputted from the data latch state determination unit and for selecting a retiming signal, and a second data latch unit for latching the data relayed by the second delay unit in accordance with the retiming clock signal, wherein the first delay unit uses a resistor and a capacitor, the data latch state determination unit uses a part of analog elements such as a resistor, a capacitor, and a comparator, and the remaining first data latch unit, second delay unit, clock selection unit, and second data latch unit uses a combined digital logic circuit, and wherein the clock selection unit includes a first logic operation unit for ANDing the data from the data latch state determination unit for being related to half the number of clocks inputted and for selecting one clock, a second logic operation unit for ANDing the data from the data latch state determination unit for being related to the number of the remaining clocks inputted and for selecting one clock, and a third logic operation unit for ANDing the signals from the first logic operation unit and the second logic operation unit and for outputting one clock.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
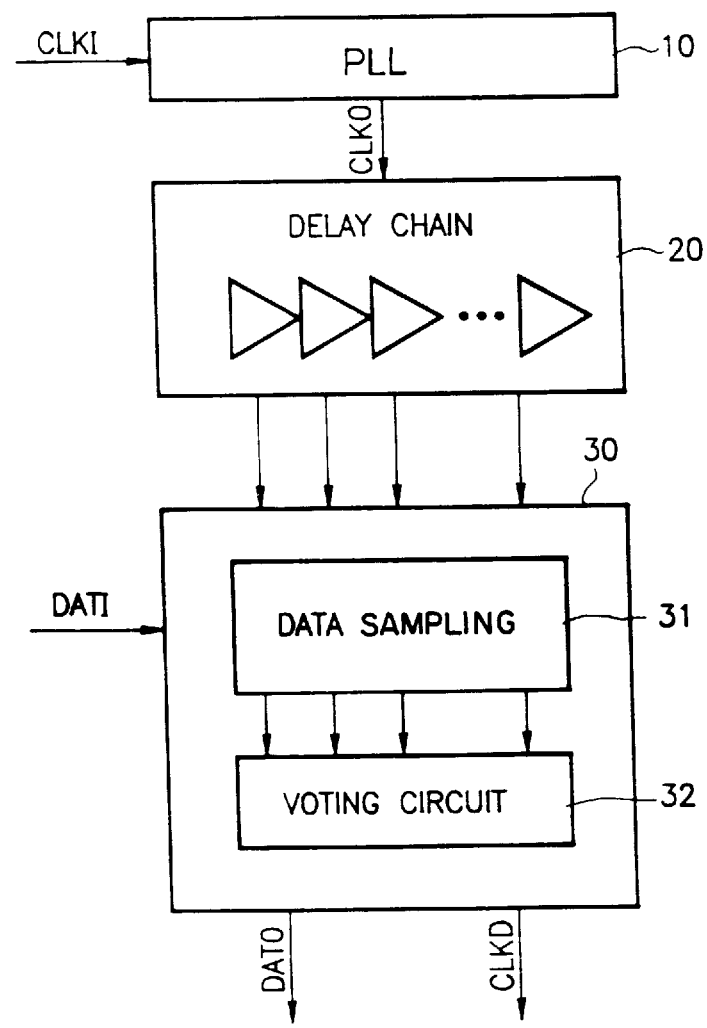
FIG. 1 is a circuit diagram illustrating a conventional digital type data retiming circuit.
Figure 2A:
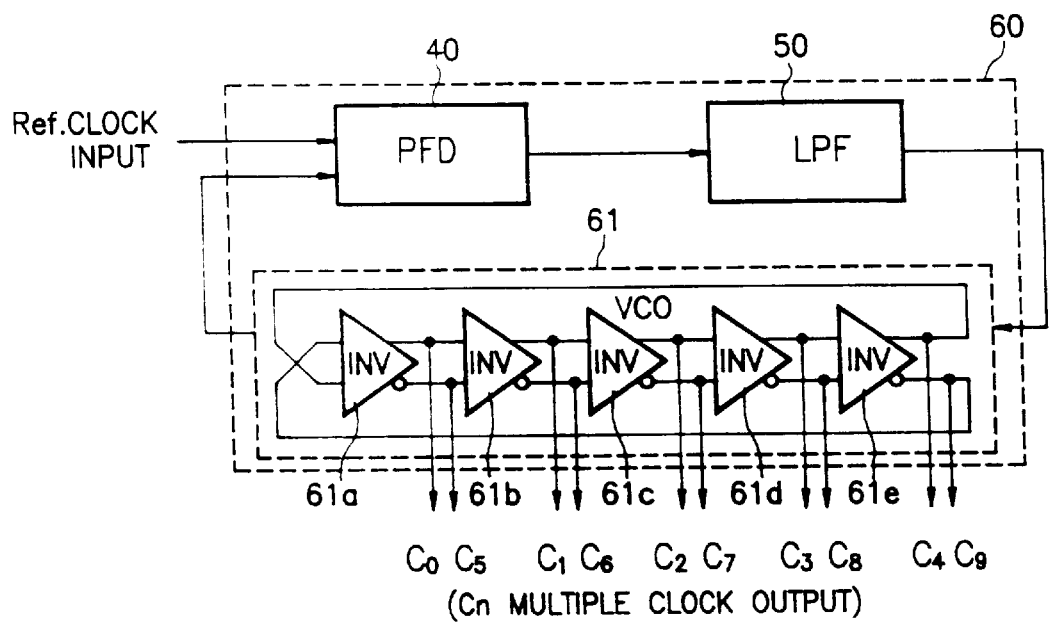
FIG. 2A is a circuit diagram illustrating a clock generation circuit of a data retiming circuit according to the present invention.
Figure 2B:
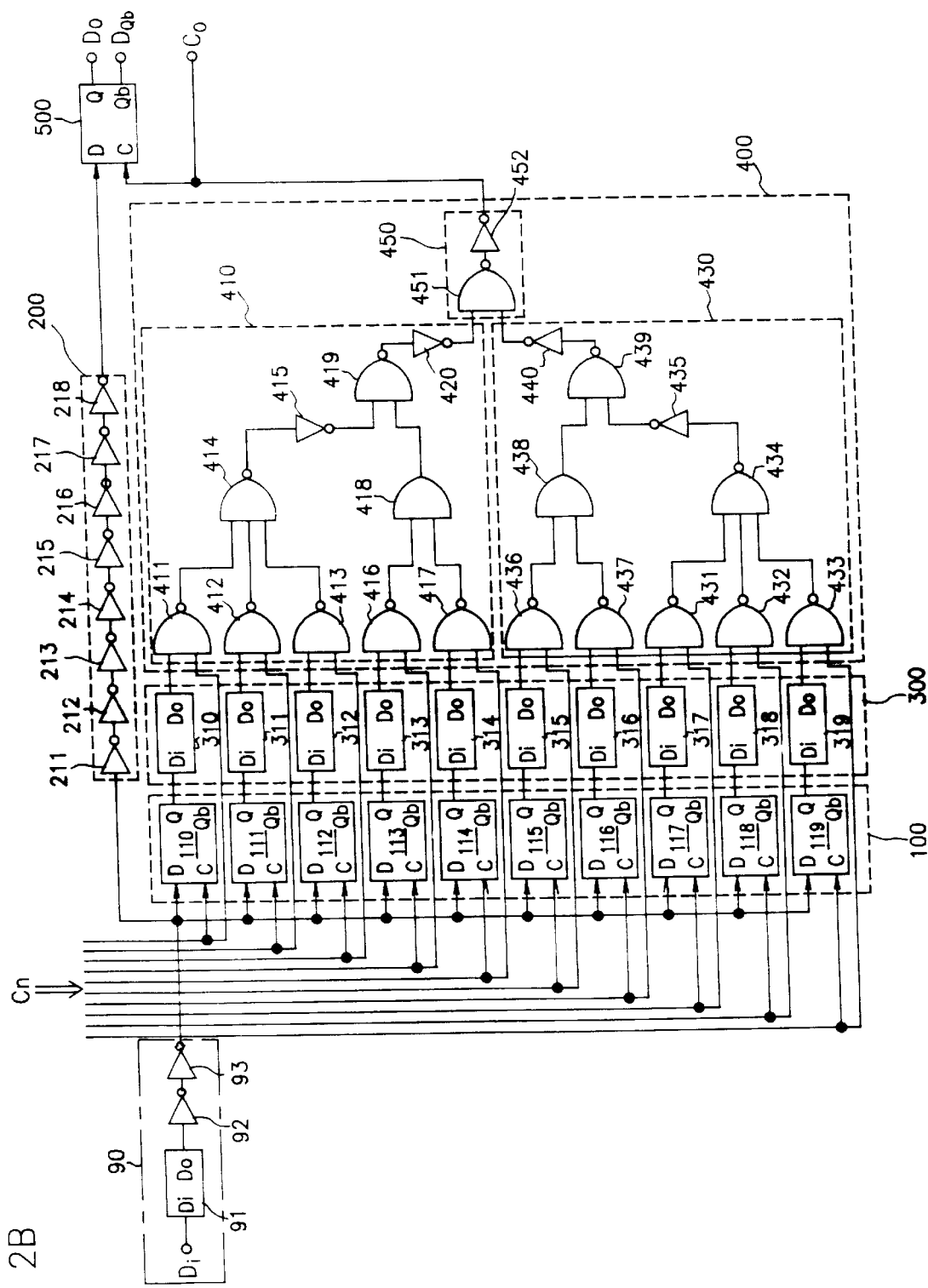
FIG. 2B is a circuit diagram illustrating a clock selection circuit of a data retiming circuit according to the present invention.

FIG. 2A is a circuit diagram illustrating a clock generation circuit of a data retiming circuit according to the present invention, and FIG. 2B is a circuit diagram illustrating a clock selection circuit of a data retiming circuit according to the present invention.

The data retiming circuit is classified into a multiple clock generation unit as shown in FIG. 2A and a clock selection unit as shown in FIG. 2B.

The multiple clock generation unit is configured by using a PLL 60 which generates multiple clocks (Cn; for example C0 through C9) of a N-number of units (the unit number×2) (for example, there are five units, the number becomes 10) from the output terminals of multiple differential amplifiers 61a through 61e of a voltage controlled oscillator 61 disposed in the PLL by using the clock from a PFD (Phase Frequency Detector) 40 and a low pass filter (LPF) 50 which receive a reference clock and a feedback clock.

The clocks generated by the multiple clock generator has a phase difference which is obtained by dividing the data period by "the unit number×2".

Next, the clock selection unit will now be explained with reference to FIG. 2B.

This clock selection unit serves to select a clock which is capable of originally retiming the data among the (unit number×2) number having different phase difference obtained by the voltage controlled oscillator 61 of the PLL 60 of the clock generator.

The construction of the clock selection unit includes a first delay unit 90 for delaying a rising and falling time of a data which is externally inputted thereto by 1.5 times, a first data latch unit 100 connected so that the phase from the clock selection unit corresponds to the number of different clocks for latching the data in accordance with the clock, a second delay unit 200 for delaying the data inputted for being coincided with the time until the data from the first delay unit is received, and one clock is selected and outputted, a data latch state determination unit 300 for determining the logic signal state of the data latched by the data latch unit 100 in analog form, a clock selection unit 400 for logically comparing a plurality of clocks with the data state signal from the data latch state determination unit 300 and for selecting a retiming clock signal, and a second data latch unit 500 for latching the data delayed by the second delay unit 200 in accordance with the retiming clock signal.

The first delay unit 90 includes an analog delay element 91 having a resistor R and a capacitor C, and two inverters 92 and 93, and the second delay unit 200 includes inverters 211 through 218 in order for the data can be delayed by the first data latch unit 100, the data latch state determination unit 300, and the clock selection unit 400. These multiple inverters serve as a buffer.

In addition, the data latch state determination unit 300 will now be explained with reference to FIG. 3. Here, reference numerals 311 through 319 have the same construction as the data latch state determination unit 300.

The data latch state determination unit 310 includes a low pass filter 320 for low-passing the data signal Di from the first data latch unit 100 by using the resistor Rf and the capacitor Cf, a voltage divider 330 for dividing an externally supplied voltage VDD by using two resistors Rh and Ri and for generating a reference voltage, and a comparator 340 for comparing the voltage from the low pass filter 320 with the reference voltage from the voltage divider 330 and for determining and outputting a latch state of each D flip-flop of the first data latch unit 100. The comparator includes an OP amplifier 341.

In addition, the clock selection unit 400 includes a first logic operation unit 410 and a second logic operation unit 430 which include NAND-gates 411, 412, 413, 414, 416, 417, and 419, and 431, 432, 433, 434, 436, 437, and 439, respectively, and AND-gates 418 and 438, and two inverters 415, 420, and 435, 440 for receiving the signal from the data latch state determination units 310 through 319 and the inputted clocks as one input, and a third logic operation unit 450 for NANDing the signal from the first logic operation unit 410 and the second logic operation unit 430 by using a NAND-gate 451 and for selecting a clock by inverting the output by using the inverter 452.

In more detail, the first logic operation unit 410 includes a first, second, third, fifth, and sixth NAND-gates 411, 412, 413, 416, and 417 for NANDing the data from the first through fifth data latch state determination units 310 through 314 and half of the plurality of clocks from the voltage control oscillator 61, a fourth-NAND-gate 414 for NANDing the signal from the NAND-gates 411, 412 and 413, a first inverter 415 for inverting the signal from the NAND-gate 414, a first AND gate 418 for NANDing the signal from the fifth and sixth NAND gates 416 and 417, a seventh NAND-gate 419 for NANDing the signals from the first inverter 415 and the first AND-gate 418, and a second inverter 420 for inverting the signal from the seventh NAND-gate 419.

The second logic operation unit 430 includes eighth, ninth, tenth, twelfth, and thirteenth NAND-gates 431, 432, 433, 436, and 437 for NANDing the data from the sixth through tenth data latch state determination units 315 through 319 and the remaining half of the plurality of clocks from the voltage control oscillator 61, an eleventh NAND-gate 434 for NANDing the signals from the NAND-gates 431, 432, and 433, a third inverter 435 for inverting the signal from the NAND-gate 434, a second AND-gate 438 for ANDing the signals from the twelfth and thirteenth gates 436 and 437, a fourteenth NAND-gate 439 for NANDing the signals from the third inverter 435 and the second AND-gate 438, and a fourth inverter 440 for inverting the signal from the NAND-gate 439.

In addition, the third logic operation unit 450 includes a fifteenth NAND-gate 451 for NANDing the signals from the second and fourth inverters 420 and 440, and a fifth inverter 452 for inverting the signal from the NANDgate 451. A selected clock is outputted from the inverter 452.

Here, the first logic operation unit 410, the second logic operation unit 430, and the-third logic operation unit 450 may be configured by combining the digital logic elements for selecting a clock.

The operation of the data retiming circuit according to the present invention will now be explained with reference to the accompanying drawings.

First, clocks having different phases are applied to the D flip-flops 110 through 119 which are provided as many as the number of clocks which cause maximum threshold voltage, and the data being inputted into the D flip-flops is inputted by increasing the rising/falling time by 1.5 times. The thusly inputted data are latched by the D flip-flops 110 through 119 and are normally outputted. If the data are latched during the rising and falling, the data are not normally outputted. That is, the data are maintained as high state.

Figure 3:
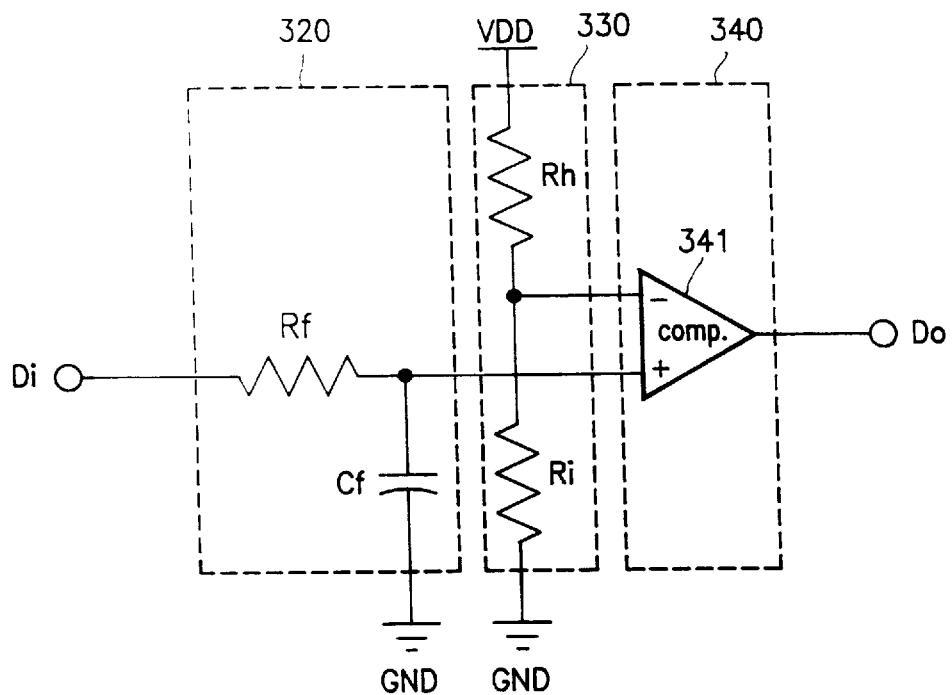
FIG. 3 is a circuit diagram illustrating a low pass filter and a voltage comparator according to the present invention.

At this time, it is possible to detect the D flop-flop which was latched during the rising or falling of the data by using the low pass filter 320, the voltage divider 330, or the voltage comparator 340 as shown in FIG. 3, which are configured in the output terminal portion of the D flip-flops. In order to select one from the multiple clocks from the D flip-flop, the first through third logic operation units 410, 430, and 450 as shown in FIG. 2B are used. Thereafter, the data signal are delayed by half the cycle by using the inverters 211 through 218 of the second delay unit 200, and the thusly delayed data are latched by using the D flip-flop of the second latch unit 500 in accordance with the clock CO selected by the clock selection unit 400, whereby a retiming is performed.

The thus retiming data is stored in an elastic buffer and is outputted in accordance with the selected clock signal, for thus obtaining a data from which the noise such as a jitter is removed.

As described above, the data retiming circuit according to the present invention is capable significantly reducing the number of gates when simplifying the construction of the circuit and implementing a desired integration, for thus reducing the fabrication cost.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A data retiming circuit comprising:
    a multiple clock generator responsive to a reference clock input for generating a plurality of clocks having a plurality of different phases;
    first delay means for delaying externally inputted data by delaying of a rising and a falling edge of the externally imputted data by a predetermined period of time;
    first data latch means for latching the data from said first delay means in accordance with the different phases of the plurality of clocks;
    data latch state determination means for determining in analog form a logic signal state of the data latched by said first data latch means and generating at least one data state signal;
    clock selection means for logically comparing the plurality of clocks with the at least one data state signal from said data latch state determination means and selecting a retiming clock signal based on the comparison;
    second delay means for receiving and further delaying the delayed data from said first delay means and for delaying the data until the retiming clock signal is generated; and
    second data latch means for latching the data delayed by said second delay means in accordance with the retiming clock signal.

2. The circuit in accordance with claim 1, wherein said first delay means comprises an analog delay element including a resistor and a capacitor.

3. The circuit in accordance with claim 1, wherein said second delay means comprises a buffer.

4. The circuit in accordance with claim 3, wherein the buffer comprises a plurality of inverters connected in series.

5. The circuit in accordance with claim 1, wherein said first data latch means comprises a plurality of D flip-flops.

6. The circuit in accordance with claim 1, wherein said data latch state determination means comprises:
    a low pass filter for low-passing the latched data signal from said first data latch means and outputting a voltage, said low pass filter including a resistor connected to a capacitor;
    a voltage divider for dividing an externally supplied voltage and generating a reference voltage, said voltage divider including two serially connected resistors; and
    a comparator for comparing the voltage from said low-pass filter with the reference voltage from said voltage divider and generating the at least one data state signal.

7. The circuit in accordance with claim 1, wherein said data latch state determination means further generates at least another data state signal, and wherein said clock selection means comprises:
    first logic operation means for ANDing half of said plurality of clocks with the at least one data state signal from said data latch state determination means associated therewith and generating a first logic signal;
    second logic operation means for ANDing the remaining half of plural said plurality of clocks with the at least another data state signal from said data latch state determination means associated therewith and generating a second logic signal; and
    third logic operation means for ANDing the first and second logic signals from said first and second logic operation means and generating the retiming clock signal.

8. The circuit in accordance with claim 7, wherein said first logic operation means comprises:
    a first, second, third, fifth and sixth NAND-gates for NANDing said half of said plurality of clocks in response to the at least one data state signal from said data latch state determination means and generating output signals;
    a fourth NAND-gate for NANDing the output signals from said first through third NAND-gates and generating an output signal;
    a first inverter for inverting the output signal from said fourth NAND-gate and generating an output signal;
    a first AND-gate for ANDing the output signals from said fifth and sixth NAND-gates and generating an output signal;
    a seventh NAND-gate for NANDing the output signal from said first inverter and the output signal from said first AND-gate and generating an output signal; and
    a second inverter for inverting the output signal from said seventh NAND-gate and generating the first logic signal.

9. The circuit in accordance with claim 7, wherein said second logic operations means comprises:
    eighth, ninth, tenth, twelfth and thirteenth NAND-gates for NANDing the remaining half of said plurality of clocks in response to the at least another data state signal from said data latch state determination means and generating output signals;
    an eleventh NAND-gate for NANDing the output signals from the eighth through tenth NAND-gates and generating an output signal;
    a third inverter for inverting the output signal from said eleventh NAND-gate and generating an output signal;
    a second AND-gate for ANDing the signals from said twelfth and thirteenth NAND-gates and generating an output signal;
    a fourteenth NAND-gate for NANDing the output signal from said third inverter and the output signal from said second AND-gate and generating and output signal; and
    a fourth inverter for inverting the output signal from said fourteenth NAND-gate and generating the second logic signal.

10. The circuit in accordance with claim 7, wherein said third logic circuit comprises:
    a fifteenth NAND-gate for NANDing the first logic signal from said first logic operation means and the second logic signal from said second logic operation means and generating an output signal; and
    a fifth inverter for inverting the output signal from said fifteenth NAND-gate and outputting the retiming clock signal.

11. The data retiming circuit of claim 1, wherein the plurality of clocks are serially and evenly shifted in phase such that each subsequently generated clock differs from each preceding clock by a phase difference, and wherein said predetermined period of time is substantially equal to the phase difference.

* * * * *